(12) United States Patent
Lam et al.

(10) Patent No.: US 7,256,568 B2
(45) Date of Patent: Aug. 14, 2007

(54) SINGLE INDUCTOR MULTIPLE-INPUT MULTIPLE-OUTPUT SWITCHING CONVERTER AND METHOD OF USE

(75) Inventors: Yat Hei Lam, New Territories (HK); Wing Hung Ki, Kowloon (HK); Chi Ying Tsui, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 286 days.

(21) Appl. No.: 11/126,875

(22) Filed: May 11, 2005

(65) Prior Publication Data

US 2005/0264271 A1  Dec. 1, 2005

Related U.S. Application Data

(60) Provisional application No. 60/569,637, filed on May 11, 2004.

(51) Int. Cl.
- G05F 1/10  (2006.01)
- G05F 1/577 (2006.01)
- H02J 1/00  (2006.01)

(52) U.S. Cl. ........................... 323/222; 323/267
(58) Field of Classification Search ............... 323/220, 323/222, 223, 225, 232, 267, 268, 271, 272; 307/18, 31, 36–39, 52, 80, 85, 86
See application file for complete search history.

(56) References Cited

U.S. PATENT DOCUMENTS

| | | | |
|---|---|---|---|
| 6,069,804 A | * | 5/2000 | Ingman et al. ............ 363/21.14 |
| 6,075,295 A | | 6/2000 | Li ................................. 307/39 |
| 6,239,995 B1 | * | 5/2001 | Weng et al. ................... 363/89 |
| 6,522,108 B2 | * | 2/2003 | Prager et al. ................ 323/222 |
| 6,919,713 B2 | * | 7/2005 | Hoshino et al. ............. 323/267 |

OTHER PUBLICATIONS

"MAX685: Dual-Output (positive and negative), DC-DC Converter for CCD and LCD", Maxim Datasheet, Apr. 1988 (www.maxim-ic.com), pp. 1-11.

"USS2941/UCC3941: 1-V Synchronous Boost Converter", Unitrode Datasheet, Jul. 1999, pp. 1-17.

D.S. Ma, W.H. Ki, C.Y. Tsui and P. Mok, "A Single-Inductor Dual-Output Integrated DC/DC Boost Converter for Variable Voltage Scheduling", IEEE/ACM Asia South Pacific Design Automation Conference, LSI University Design Contest, pp. 19-20, Jan. 2001.

M. W. May, M.R. May, J.E. Willis, "A Synchronous Dual-Output Switching dc-dc Converter Using Multibit Noise-Shaped Switch Control", IEEE International Solid-State Circuit Conference, pp. 358-359, 2001.

(Continued)

*Primary Examiner*—Matthew V. Nguyen
(74) *Attorney, Agent, or Firm*—Heslin Rothenberg Farley & Mesiti P.C.

(57) ABSTRACT

A single inductor multiple-input multiple-output (SI-MIMO) switching converter time-multiplexes different input power sources through only one inductor to provide multiple regulated output voltages, which can be used to power up different blocks of a portable electronic device (or whatever else it is used for) and at the same time to charge up a rechargeable battery. Power multiplexing is achieved by input switches that are also the switching elements of the switching converter, thus eliminating an additional power multiplexer.

27 Claims, 5 Drawing Sheets

OTHER PUBLICATIONS

D. Ma, W.H. Ki, C.Y. Tsui and P. Mok, "Single-Inductor Multiple-Output Switching Converters with Time-Multiplexing Control in Discontinuous Conduction Mode," IEEE J. of Solid-State Ckts. vol. 38, No. 1, pp. 89-100, Jan. 2003.

D. Ma, W.H. Ki and C.Y. Tsui, "A Pseudo-CCM/DCM SIMO Switching Converter with Freewheel Switching", IEEE Journal of Solid-State Circuit, vol. 8, No. 6, pp. 1007-1014, Jun. 2003.

"MAX1645: Advanced-Chemistry-Independent, Level-2 Battery Chargers with Input Current Limiting", Datasheet, Maxim Integrated Products, Jan. 2001.

"BQ24700: Battery Charger Controller and Selector with DPM", Datasheet, Texas Instruments Inc., Apr. 2001.

"AN676: New Developments in Battery Chargers", Application Notes, Maxim Integrated Products, Mar. 15, 2000.

* cited by examiner

SINGLE INDUCTOR MULTIPLE-INPUT MULTIPLE-OUTPUT SWITCHING CONVERTER AND METHOD OF USE

CROSS-REFERENCE TO RELATED APPLICATIONS

This application claims the benefit of U.S. Provisional Application No. 60/569,637, filed May 11, 2004, which is hereby incorporated herein by reference in its entirety.

FIELD OF THE INVENTION

This invention relates to switching DC/DC converters. More particularly, the invention relates to multiple-input multiple-output (MIMO) switching converters.

BACKGROUND OF THE INVENTION

For battery-operated portable equipment, rechargeable batteries are usually used as an offline power source. A battery power management system is needed to deliver power from either an external DC source or from a rechargeable battery to the equipment. When the external power source is available, it provides regulated power for the load and charges the battery (external mode). When the external power source is unplugged, the battery is then switched to be the power source (battery mode). A conventional realization may use a battery charger for charging the battery and another voltage regulator for power regulation. A power multiplexer is also needed to switch between the power sources. Switching converters are usually employed to implement the battery charger and the voltage regulator due to their high efficiency. As a result, a battery power management system may require a few switching converters and power multiplexers for switching between power sources and to generate multiple regulated power supplies.

Among existing multiple-supply implementations, a single inductor multiple-output (SI-MO) switching converter is a very cost-effective solution. Only one off-chip inductor is required to provide multiple regulated outputs. Low cross-regulation can be achieved by employing time-multiplexing (TM) control that works in discontinuous conduction mode (DCM) or by allowing the inductor current to work in pseudo-continuous conduction mode (PCCM) with freewheel switching control. Power multiplexers are then used to switch among the various power sources in the battery power management system.

A battery power management (BPM) system has two functions: power regulation and battery charging. Prior BPM systems consist of individual power regulators and battery charger, and power multiplexers are used to switch among the power paths. The battery charger could be a linear regulator, but a switching converter is often used for its high efficiency such that no heat sink is needed. Similarly, switching converters are usually used for power regulation due to their high efficiency over a wide loading current range, and that they can implement voltage step-up, step-down and inversion. Hence, for a high-efficiency BPM system with one battery and one regulated output, two switching converters using two inductors are needed. Moreover, a power multiplexer consists of two power switches is used to switch between the two power sources. Therefore, the BPM system requires at least two inductors and six power switches.

As a result, an integrated solution to perform power path control and multiple-output power regulation is desirable for reducing the PCB (printed circuit board) area, system complexity and overall production cost.

SUMMARY OF THE INVENTION

The present invention is able to provide a DC-DC converter that allows multiple input power sources to be multiplexed through only one inductor to provide multiple independently-regulated outputs in an integrated manner.

In accordance with the present invention, a single inductor multiple-input multiple-output (SI-MIMO) switching converter is provided. The converter time-multiplexes different input power sources through only one inductor to provide multiple regulated output voltages, which can be used to power up different blocks of the portable electronic device (or whatever else it is used for) and at the same time to charge up the rechargeable battery. Compared to prior designs, the number of inductors is reduced to the minimum number, of one. Moreover, power multiplexing is achieved by the input switches that are also the switching elements of the switching converter, thus eliminating an additional power multiplexer.

The switching converter according to the invention is particularly advantageous if applied in an electronic appliance, such as, but not limited to, a battery operated portable electronic device using one or multiple rechargeable batteries that requires an accompanying charger.

BRIEF DESCRIPTION OF THE DRAWINGS

Some embodiments of the invention will now be described by the way of non-limitative example and with reference to the accompanying drawings, in which.

DETAILED DESCRIPTION OF THE INVENTION

Figure 1:
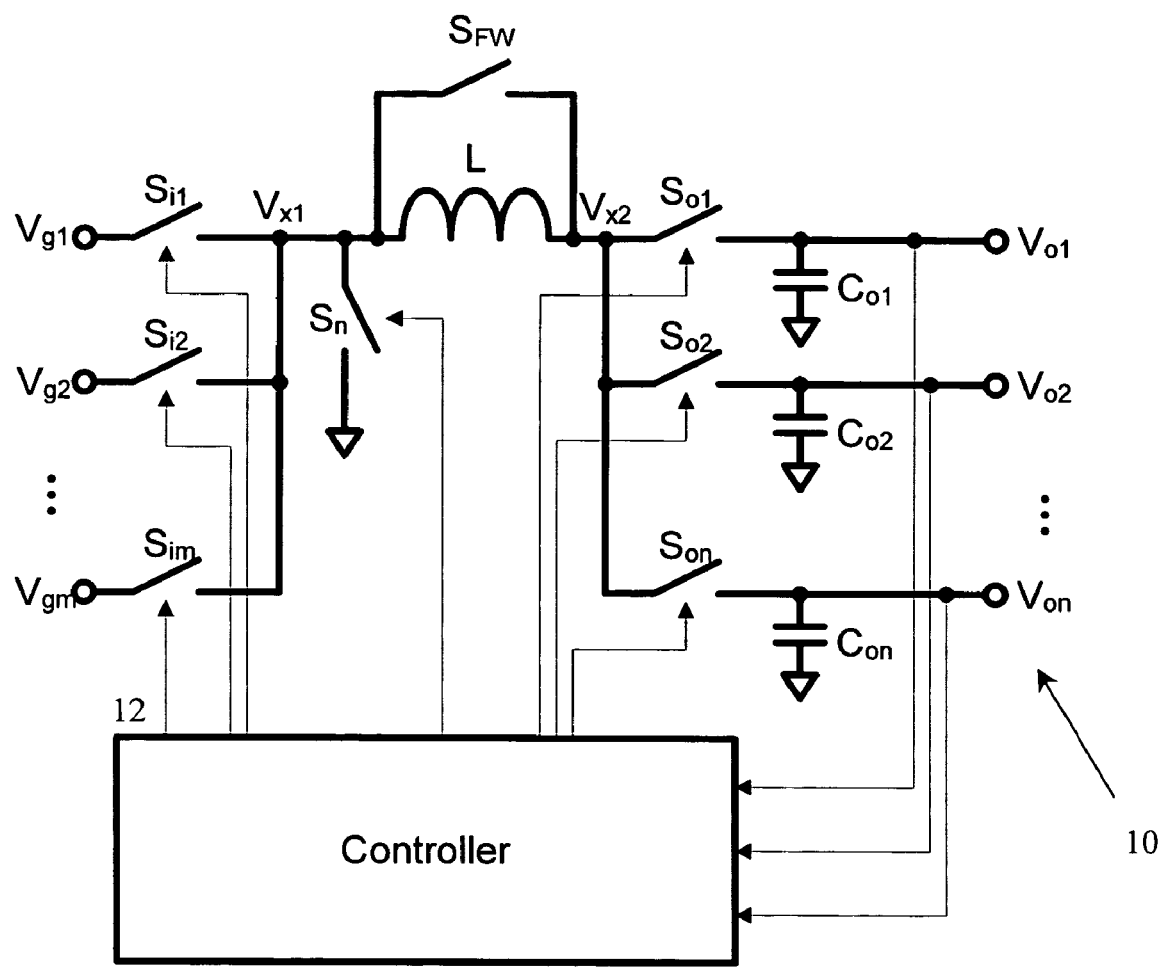
FIG. 1 is a circuit diagram of an exemplary embodiment of the present invention showing a single-inductor MIMO buck switching converter.

One single-inductor multiple-input multiple-output (SI-MIMO) buck converter 10 is shown in FIG. 1. This converter 10 has M input ports and N output ports. The converter includes an inductor L, coupled between a first node $V_{x1}$ and a second node $V_{x2}$. A ground switch $S_n$ is coupled in series with the inductor L between the first node $V_{x1}$ and a reference voltage, typically ground. M Input switches $S_{i1}, S_{i2}, \ldots$ and $S_{iM}$ are coupled in series with the inductor L between the first node $V_{x1}$ and M input terminals $V_{g1}, V_{g2}, \ldots$ and $V_{gM}$, respectively. A freewheel switch $S_{FW}$ is coupled between the first node $V_{x1}$ and the second node $V_{x2}$. N Output switches $S_{o1}, S_{o2}, \ldots$ and $S_{oN}$ are coupled in series with the inductor L between the second node $V_{x2}$ and N output terminals $V_{o1}, V_{o2}, \ldots$ and $V_{oN}$, respectively. N output capacitors $C_{o1}, C_{o2}, \ldots$ and $C_{oN}$ are coupled between the output terminals $V_{o1}, V_{o2}, \ldots$ and $V_{oN}$, respectively. The freewheel switch $S_{FW}$ is not needed if the converter operates in discontinuous conduction mode. The values of M and N in this embodiment are not necessarily the same, and they can be any integer greater than or equal to one. The on and off operations of the switches in the switching converters are controlled by a feedback controller 12.

Figure 2:
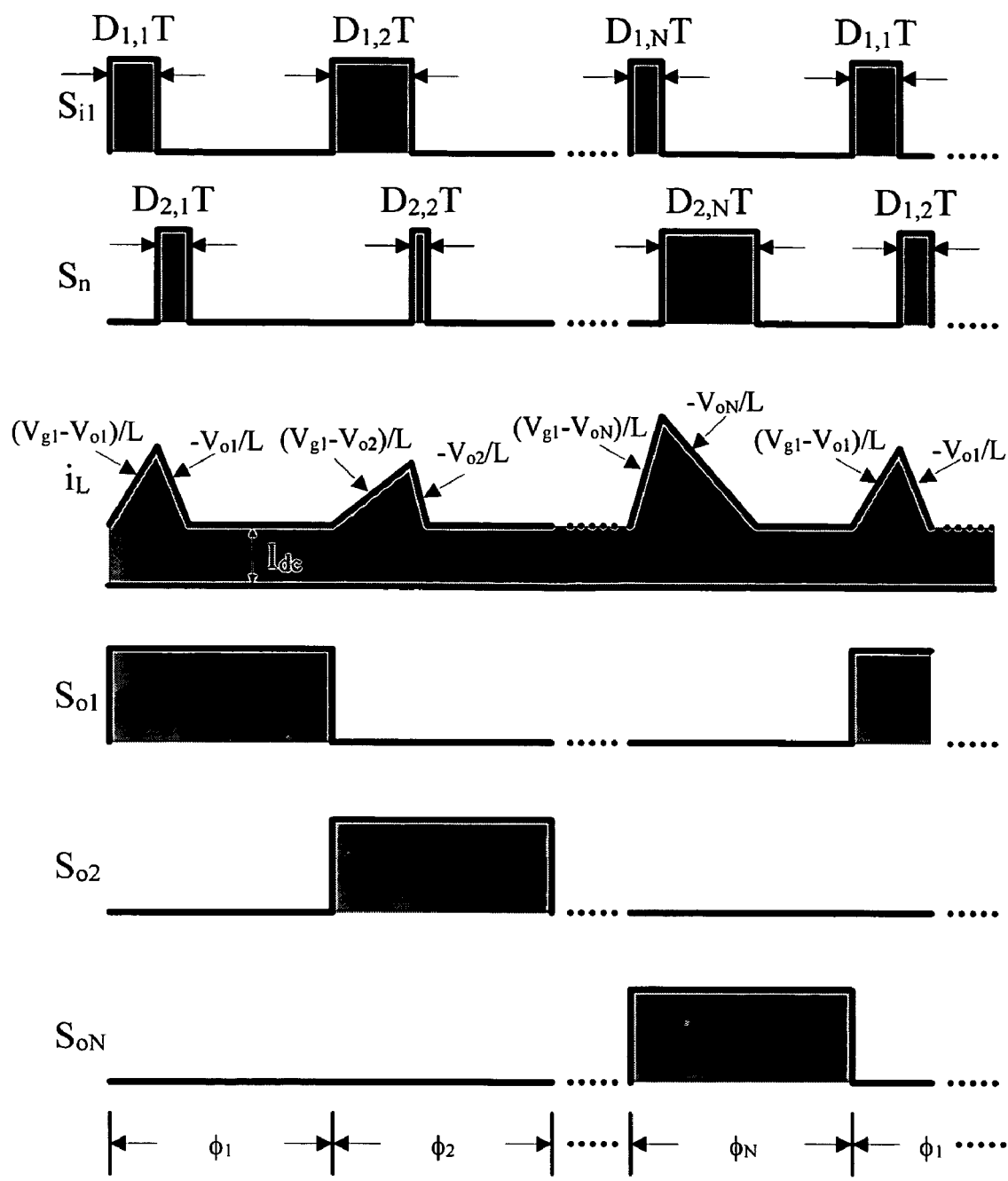
FIG. 2 is a timing diagram of the single-inductor MIMO buck converter of FIG. 1.
Figure 3:
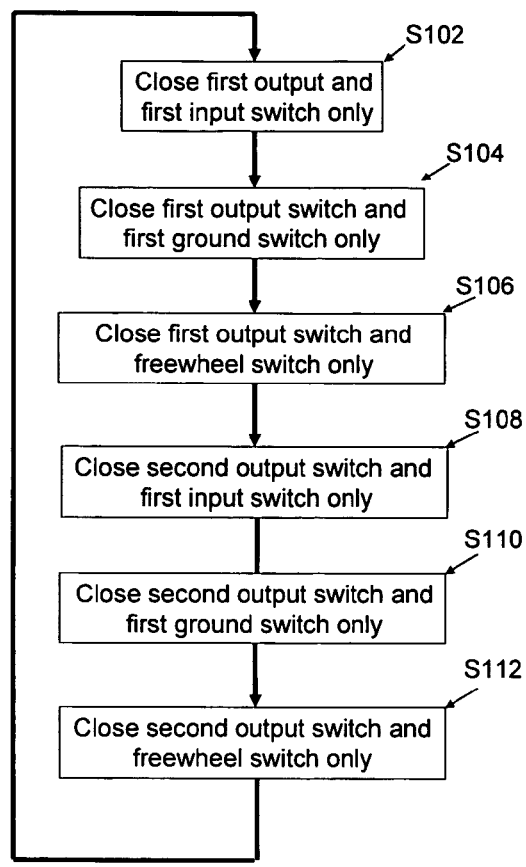
FIG. 3 is a flowchart relating to an operation of the circuit of FIG. 1.

The timing diagram in FIG. 2 illustrates one possible operation scheme of the switching converter 10 in FIG. 1. Exemplary operation of the switching converter 10 is described with reference to the timing diagram of FIG. 2 and a flowchart of FIG. 3.

Consider a sub-converter with a first input power source $V_{g1}$ and a first output voltage $V_{o1}$. Assume that the input switch $S_{i1}$ is active, and the other input switches $S_{i2}$, $S_{i3}, \ldots$ and $S_{iM}$ are kept open all the time. Initially, at least, the ground switch $S_n$ is also open. During phase 1 ($\phi_1$), only the first output switch $S_{o1}$ and the first input switch $S_{i1}$, are closed (step S102), and the inductor current ($i_L$) charges up at a rate of $(V_{g1}-V_{o1})/L$ and flows into the first output terminal $V_{o1}$. After a duration of $D_{1,1}T$, only the first output switch $S_{o1}$ and the ground switch $S_n$ are closed (step S104), such that the inductor current ramps down at a rate of $V_{o1}/L$, where $D_{1,1}$ is the duty ratio for the sub-converter in a switching period of T seconds. Once the inductor current reaches a preset current level $I_{dc}$, the ground switch $S_n$ is turned off and the freewheel switch $S_{FW}$ is closed (step S106), and the inductor current stays at the preset current level $I_{dc}$ until the start of the next phase. The first output voltage $V_{o1}$ is controlled by adjusting $D_{1,1}T$.

During a second phase, phase 2 ($\Phi_2$), only the second output switch $S_{o2}$ and the first input switch $S_{i1}$ are closed (step S108). The inductor current charges up at a rate of $(V_{g1}-V_{o2})/L$ and flows into the second output terminal $V_{o2}$. Only the second output switch $S_{o2}$ and the ground switch $S_n$ are closed after a duration of $D_{1,2}T$ (step S110), such that the inductor current ramps down at a rate of $V_{o2}/L$, where $D_{1,2}$ is the duty ratio for the sub-converter in a switching period of T seconds. Once the inductor current again reaches a preset current level $I_{dc}$, the ground switch $S_n$ is turned off and the freewheel switch $S_{FW}$ is closed (step S112), and the inductor current stays at the preset current level $I_{dc}$ until the start of the next phase. The second output voltage $V_{o2}$ is controlled by adjusting $D_{1,2}T$.

For a switching converter with N outputs, there may be N phases (from $\phi_1$ to $\phi_N$). Similar action applies to the sub-converter that is active during each phase K ($\phi_K$), with K=1, 2, ..., N. The $K^{th}$ output switch $S_{oK}$ is turned on while other output switches are off. The first input switch $S_{i1}$ is turned on first, and energy is extracted from the first input power source $V_{g1}$ for a duration of $D_{1,N}T$. The first input switch $S_{i1}$ is then turned off and the ground switch $S_n$ is turned on such that the inductor current eventually goes back to a preset value of $I_{dc}$. The converter is said to be operating in a discontinuous conduction mode (DCM) if $I_{dc}$=0 and pseudo-continuous conduction mode (PCCM) if $I_{dc}$>0. The freewheel switch $S_{FW}$ may not be needed if the converter is designed to operate in DCM only.

The inductor current goes back to its preset level $I_{dc}$ at the end of every phase, such that the current profile in each phase is independent of the other phases. Hence, the energy delivered to one output is independent of the others. Therefore, very low cross regulation can be achieved.

The selection of the power source of the system is made by activating the corresponding input switch. In the example illustrated in FIG. 2, the first input voltage/terminal $V_{g1}$ is activated as the power source of the system by using the first input switch $S_{i1}$ as the input switching element while other input switches are turned off. If the $M^{th}$ input terminal $V_{gM}$ is selected as the active power source for the system, then the $M^{th}$ input switch $S_{iM}$ is used instead of the first input switch $S_{i1}$ as the input switching element of the switching converter. The change of the active input switch can be made at any time during the operation of the switching converter 10. The input switches $S_{i1}$ to $S_{iM}$, the output switches $S_{o1}$ to $S_{oN}$, the ground switch $S_n$ and the freewheel switch $S_{FW}$ in the present invention can be implemented by, but not limited to, transistors, particularly either bipolar or MOSFET transistors. There may also be diodes arranged in series with the switches to force the current to flow in one direction only.

Figure 4:
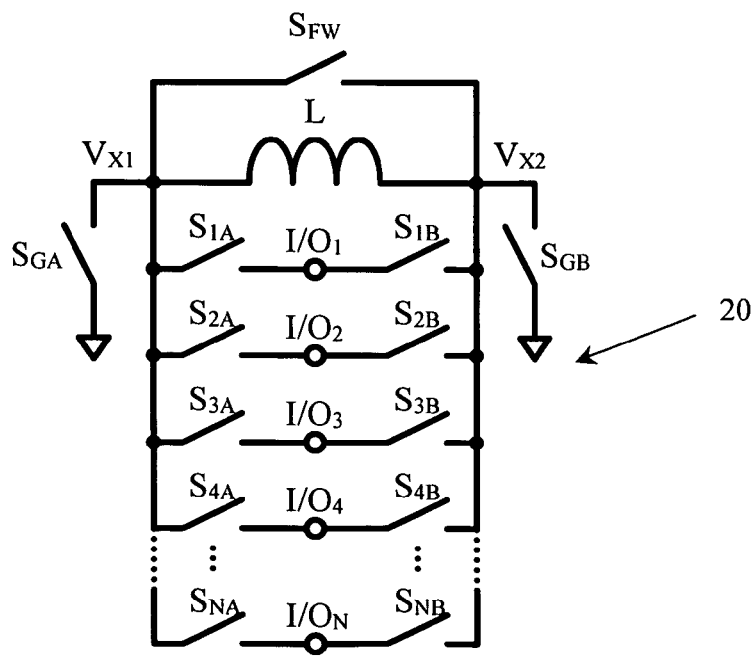
FIG. 4 is a circuit diagram of an exemplary embodiment of the present invention showing a generalized single-inductor MIMO switching converter.

The principle of the present invention can be employed in various SI-MIMO switching converter configurations for different DC-DC conversions. FIG. 4 shows a generalized SI-MIMO converter 20. The converter 20 has N I/O (input/output) ports $I/O_1, I/O_2, \ldots, I/O_N$. N input switches, $S_{1A}, S_{2A}, \ldots, S_{NA}$, are mounted between a first node $V_{x1}$ of the inductor L and the N I/O ports $I/O_1, I/O_2, \ldots, I/O_N$, respectively. N output switches, $S_{1B}, S_{2B}, \ldots, S_{NB}$, are mounted between a second node $V_{x2}$ of the inductor L and the N I/O ports $I/O_1, I/O_2, \ldots, I/O_N$, respectively. One freewheel switch $S_{FW}$ is mounted between the first node $V_{x1}$ and the second node $V_{x2}$ of the inductor L. A first ground switch $S_{GA}$ is connected between the first node $V_{x1}$ and a reference voltage, such as ground. A second ground switch $S_{GB}$ is connected between the second node $V_{x2}$ and a reference voltage, such as ground. Each I/O port can be taken as a power source input port or as a regulated output port.

Figure 5A:
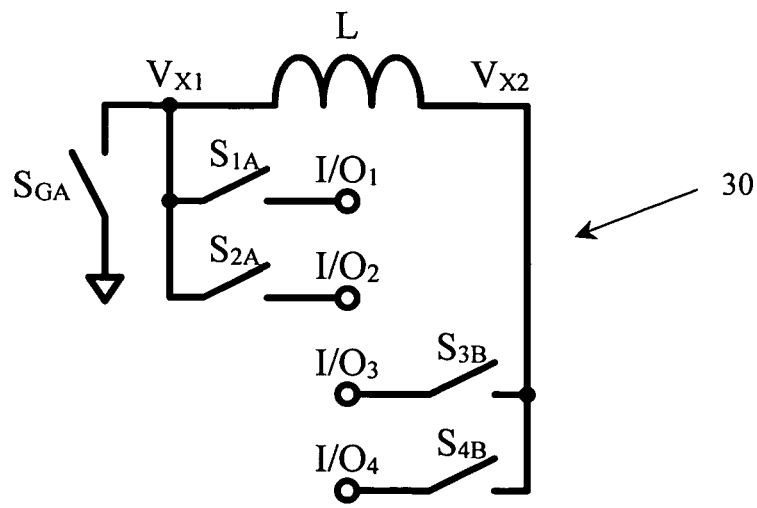
FIG. 5(a) and FIG. 5(b) are alternative circuit diagrams of an exemplary embodiment of the present invention showing a single-inductor dual-input dual-output (DIDO) buck converter.
Figure 5B:
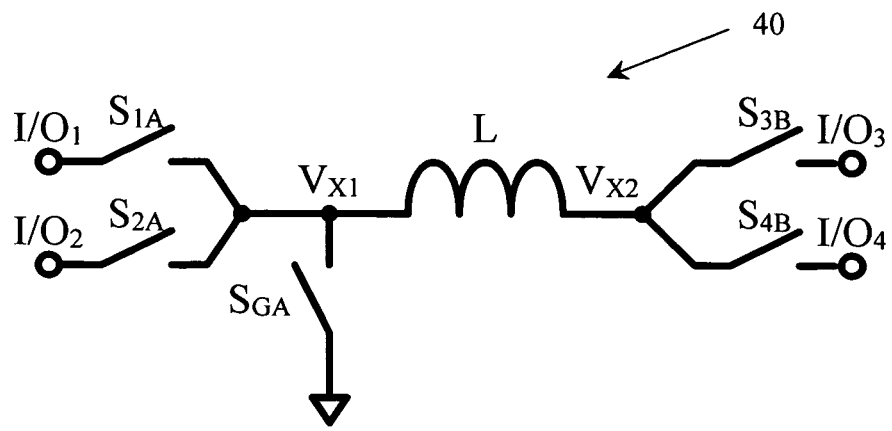

For example, the SI-MIMO converter can be transformed to a single-inductor DIDO buck switching converter 30 by connecting two power sources to the first and second I/O ports $I/O_1$ and $I/O_2$, respectively and the two loadings to the third and fourth I/O ports $I/O_3$ and $I/O_4$, respectively, as illustrated in FIG. 5a. Only the first ground switch $S_{GA}$, the first two input switches $S_{1A}, S_{2A}$, and the third and fourth output switches $S_{3B}$ and $S_{4B}$ are to be used, in effect giving the arrangement shown in FIG. 5a. This same combination can also appear as in FIG. 5b such that the circuit 40 has a similar structure to that shown in FIG. 1.

In battery operated portable applications, rechargeable batteries are used as offline power sources. In such a case, the rechargeable battery can either be the system power source when the portable equipment is offline, or it can be the system loading when it is charged by an external DC power source.

Figure 6A:
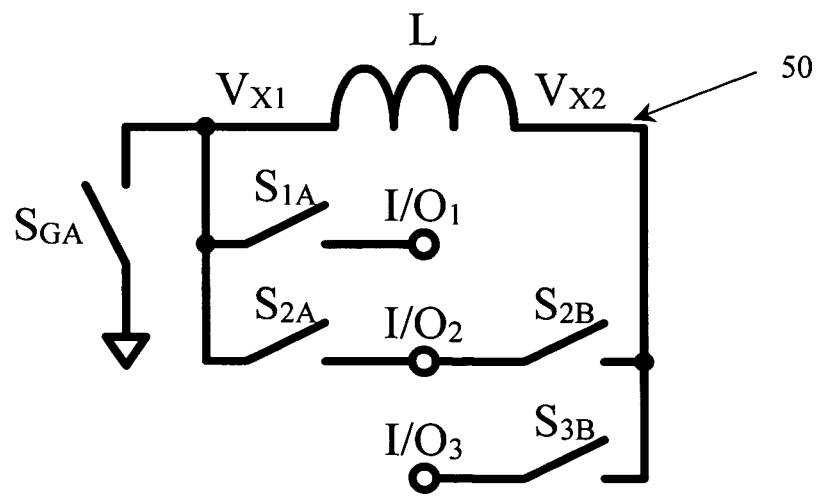
FIG. 6(a) and FIG. 6(b) are alternative circuit diagrams of an exemplary embodiment of the present invention showing a single-inductor dual-input dual-output (DIDO) buck converter for battery power management system with one rechargeable battery, one external DC power source and one regulated power output.
Figure 6B:
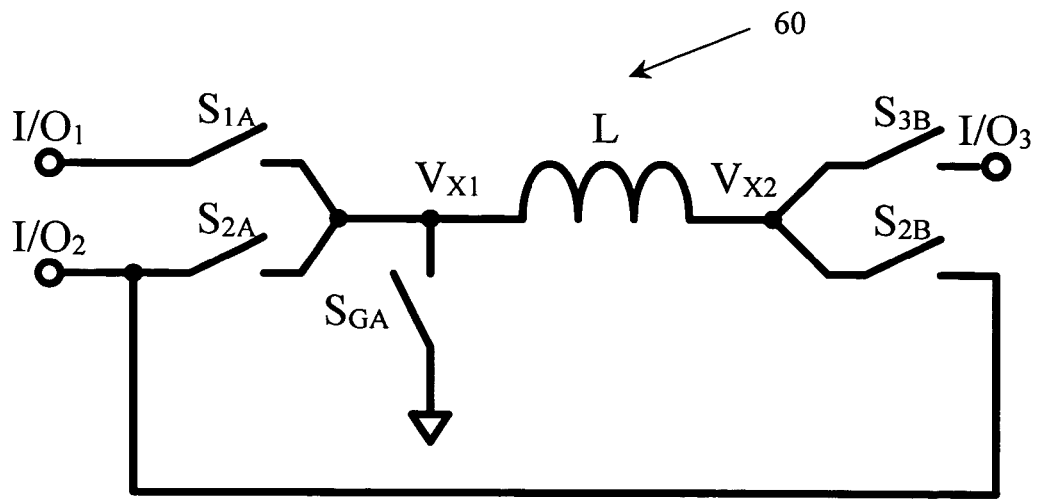

For example, in a battery power management system with only one rechargeable battery, a single-inductor DIDO buck switching converter 50 can be used as illustrated in FIG. 6a. Similar to FIG. 5a, the single-inductor DIDO buck switching converter 50 of FIG. 6a is transformed from the generalized SI-MIMO converter 20 of FIG. 4, by using the first ground switch $S_{GA}$, the first and second input switches $S_{1A}$, $S_{2A}$, and the second and third output switches $S_{2B}$ and $S_{3B}$ only. Note that the second I/O port $I/O_2$ is used as an input and an output port at different times. The converter arrangement in FIG. 6a is also equivalent to the converter circuit 60 as shown in FIG. 6b.

Figure 7:
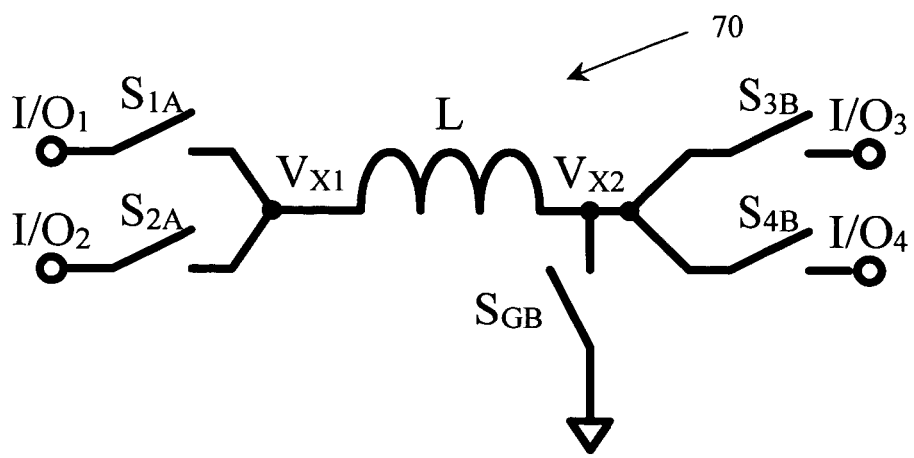
FIG. 7 is a circuit diagram of an exemplary embodiment of the present invention showing a single-inductor DIDO boost converter.
Figure 8:
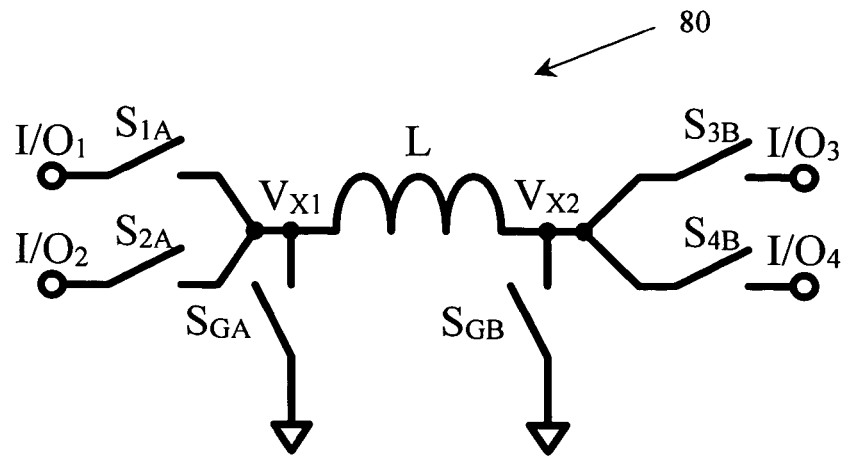
FIG. 8 is a circuit diagram of an exemplary embodiment of the present invention showing a single-inductor DIDO switching converter with both buck and boost types of outputs.

With the introduction of the generalized SI-MIMO switching converter 20, conversion types other than the buck topology can easily be achieved by using appropriate switches and I/O ports. For example, to realize a single-inductor DIDO boost switching converter 70, the first and second input switches $S_{1A}$, $S_{2A}$, the third and fourth output switches $S_{3B}$, $S_{4B}$ and the second ground switch $S_{GB}$ of FIG. 4 are used, as shown in FIG. 7. As another example, to implement a single-inductor DIDO switching converter 80 with one buck type output and one boost type output, one may use the first and second input switches $S_{1A}$, $S_{2A}$, the third and fourth output switches $S_{3B}$, $S_{4B}$, and both the first and second ground switches $S_{GA}$ and $S_{GB}$ only, as shown in FIG. 8. For the circuit in FIG. 8, there are many timing sequences that can achieve this function. Some of the schemes are shown below:

Scheme 1: $(S_{1A},S_{GB}) \to (S_{GA},S_{3B}) \to (S_{GA},S_{GB}) \to (S_{1A},S_{GB}) \to (S_{GA},S_{4B}) \to (S_{GA},S_{GB}) \to$ repeats Scheme 2: $(S_{2A},S_{GB}) \to (S_{GA},S_{3B}) \to (S_{GA},S_{GB}) \to (S_{2A},S_{GB}) \to (S_{GA},S_{4B}) \to (S_{GA},S_{GB}) \to$ repeats Scheme 3: $(S_{1A},S_{GB}) \to (S_{GA},S_{3B}) \to (S_{GA},S_{GB}) \to (S_{2A},S_{GB}) \to (S_{GA},S_{4B}) \to (S_{GA},S_{GB}) \to$ repeats Scheme 4: $(S_{2A},S_{GB}) \to (S_{GA},S_{3B}) \to (S_{GA},S_{GB}) \to (S_{1A},S_{GB}) \to (S_{GA},S_{4B}) \to (S_{GA},S_{GB}) \to$ repeats Switches in the same brackets are closed at the same time, while other switches are open at that time. The arrows indicate the sequence of the switching.

Although FIGS. 5a, 5b, 6a, 6b, 7 and 8 show converters with two inputs and two outputs, it is apparent that the principles of the present invention are valid for converters with more than two inputs or more than two outputs or more than both two inputs and two outputs, as shown in FIG. 4. Each of the circuits in the above figures and the corresponding extensions can be implemented and operated in accordance with the principles of the invention.

In the above description, the terms input and output are not necessarily limiting on the circuits; they are labels used to help distinguish the different components, depending on the main, but not necessarily sole, purpose of each component. For example, a buck switching converter can also work as a boost switching converter, depending on the relative voltages of the inputs and outputs and the timings of the switches. In that case the so-named input switches and output switches would actually be working as output switches and input switches, respectively.

The above described embodiments of the present invention integrate the power multiplexing function into the single-inductor multiple-output converter such that it can switch among several power sources and generate multiple regulated outputs. In doing so, efficiency can be improved and overall chip area and cost can be reduced.

Embodiments of the present invention may be applied in many applications where multiple inputs are involved. In addition to applications described in the Background of the Invention, another possible application is that an increasing number of systems are using multiple batteries for power management. By having multiple inputs, energy from different batteries can be directed to the same load in optimizing the performance of the batteries. Using an SI MIMO converter according to an embodiment of the invention avoids the need to use a large number of switching converters with many inductors.

Although preferred embodiments of the inventions have been disclosed, with various components, persons skilled in the art will appreciate that it may not be necessary for such connections to be direct and additional components may be interconnected between the shown connected components without departing from the spirit of the invention as shown. Persons skilled in the art will appreciate also that the present invention can be practiced by other than the described embodiments. The described embodiments are presented for purposes of illustrations and not of limitation, and the present invention is limited only by the claims that follow.

The invention claimed is:

1. A voltage converter comprising:
   an inductor having a first end and a second end;
   a plurality of first switches, connected between the first end of the inductor and a plurality of first terminals;
   a plurality of second switches, connected between the second end of the inductor and a plurality of second terminals;
   a freewheel switch, coupled between the first and the second end of the inductor;
   a first ground switch, coupled between one of the ends of said inductor and a reference voltage; and
   a switch controller, coupled to drive on/off switching of said plurality of first switches, said plurality of second switches, said freewheel switch and said first ground switch, wherein the switch controller is arranged to connect a first one of the first terminals to a different one or more of the second terminals, through the inductor, at different times, and to connect a second one of the first terminals to a different one or more of the second terminals, through the inductor, at different times.

2. The voltage converter of claim 1, wherein the switch controller is arranged to:
   close a first one of the second switches, connected to a first one of the second terminals, and while the first one of the second switches is closed:
      close a first one of the first switches, connected to a first one of the first terminals, to store energy in the inductor; and
      open the first one of the first switches and close the first ground switch, to transfer energy from the inductor to the first one of the second terminals;
   open the first ground switch, open the first one of the second switches and close a second one of the second switches, connected to a second one of the second terminals, and while the second one of the second switches is closed:
      close the first one of the first switches, to store energy in the inductor; and
      open the first one of the first switches and close the first ground switch, to transfer energy from the inductor to the first one of the second terminals.

3. The voltage converter of claim 1, wherein the first ground switch is coupled between the first end of said inductor and a reference voltage, and wherein the switch controller is arranged to:
   while a first one of the second switches, connected to a first one of the second terminals, is closed:
      close a first one of the first switches, connected to a first one of the first terminals, to store energy in the inductor;
      open the first one of the first switches and close the first ground switch, to transfer energy from the inductor to the first one of the second terminals;
      close a freewheel switch and open all other switches to hold energy in the inductor;

open the first ground switch and the freewheel switch and close a second one of the first switches, to store energy in the inductor;

open the second one of the first switches and close the first ground switch, to transfer energy from the inductor to the first one of the second terminals; and close a freewheel switch and open all other switches to hold energy in the inductor.

4. The voltage converter of claim 1, wherein a first one of the first switches is connected to a first one of the first terminals, a second one of the first switches is connected to a second one of the first terminals, and the switch controller is arranged to:

gate the first one of the first switches when and only when a switching phase begins and said first one of the first terminals is selected as a power source, said switching phase beginning a time period when said inductor stores energy, which is then transferred to one of said outputs;

gate the second one of the first switches when and only when a switching phase begins and said second one of the first terminals is selected as a power source, said switching phase beginning a time period when said inductor stores energy, which is then transferred to one of said outputs.

5. The voltage converter of claim 1, further comprising a second ground switch coupled between the other one of the ends of said inductor and a reference voltage.

6. The voltage converter of claim 5, wherein the first ground switch is connected to the first end of the inductor.

7. The voltage converter of claim 1, wherein the first terminals comprise input power terminals, the first switches comprise input switches, the second terminals comprise output power terminals, and the second switches comprise output switches.

8. The voltage converter of claim 7, wherein the input terminals provide unregulated voltage sources and the output terminals provide independently regulated voltages.

9. The voltage converter of claim 1, further comprising capacitors, connected between individual second terminals and a reference voltage.

10. The voltage converter of claim 1, wherein the reference voltage is ground.

11. The voltage converter of claim 1, wherein the individual first switches are bipolar transistors or MOSFETs.

12. The voltage converter of claim 1, wherein the individual second switches are bipolar transistors, MOSFETs or diodes.

13. The voltage converter of claim 1, wherein said first ground switch is selected from a group consisting of a bipolar transistor and a MOSFET.

14. The voltage converter of claim 1, further comprising diodes in series with the first switches.

15. The voltage converter of claim 1, further comprising diodes in series with the second switches.

16. The voltage converter of claim 1, further comprising a diode in series with the first ground switch.

17. The voltage converter of claim 1, further comprising at least one source of electrical potential, coupled between at least one of the first terminals and said reference voltage.

18. The voltage converter of claim 17, wherein the at least one source of electrical potential is between two of a first positive supply voltage, a second positive supply voltage, a ground, a first negative supply voltage and a second negative supply voltage.

19. The voltage converter of claim 2, wherein said switch controller comprises time sequencing logic that controls ON-OFF switching of said first and second second switches such that said first and second second switches are charged alternately on a pulse by pulse basis.

20. The voltage converter of claim 2, wherein said switch controller comprises input terminal selection logic that controls ON-OFF switching of said first and second first switches, such that first terminal selection is done by activating the corresponding switch.

21. The voltage converter of claim 1, wherein a plurality of the first and second terminals are both first and second terminals.

22. A voltage converter comprising:

an inductor having a first end and a second end;

a plurality of first switches, connected between the first end of the inductor and a plurality of first terminals;

at least one second switch, connected between the second end of the inductor and at least one second terminal;

a first ground switch, coupled between one of the ends of said inductor and a reference voltage; and a switch controller, coupled to drive on/off switching of said plurality of first switches, said at least one second switch and said first ground switch, wherein the switch controller is arranged to connect different ones of the first terminals to the at least one second terminal, through the inductor, at different times.

23. A voltage converter as defined in claim 22, wherein the switch controller is arranged to:

while the at least one second switch, connected to the at least one second terminal, is closed:

close a first one of the first switches, connected to a first one of the first terminals, to store energy in the inductor;

open the first one of the first switches and close the first ground switch, to transfer energy from the inductor to the at least one second terminal;

open the first ground switch and close a second one of the first switches, to store energy in the inductor; and open the second one of the first switches and close the first ground switch, to transfer energy from the inductor to the at least one second terminal.

24. A method of operating a voltage converter, wherein the converter comprises an inductor having a first end and a second end; a plurality of first switches, connected between the first end of the inductor and a plurality of first terminals; a plurality of second switches, connected between the second end of the inductor and a plurality of second terminals; a first ground switch, coupled between one of the ends of said inductor and a reference voltage; and a switch controller, coupled to drive on/off switching of said plurality of first switches; the method comprising:

closing a first one of the second switches, connected to a first one of the second terminals, and while the first one of the second switches is closed:

closing a first one of the first switches, connected to a first one of the first terminals, to store energy in the inductor; and opening the first one of the first switches and closing the first ground switch, to transfer energy from the inductor to the first one of the second terminals;

opening the first ground switch, opening the first one of the second switches and closing a second one of the second switches, connected to a second one of the second terminals, and while the second one of the second switches is closed:

closing the first one of the first switches, to store energy in the inductor; and opening the first one of the first switches and closing the first ground switch, to transfer energy from the inductor to the first one of the second terminals.

25. A method of operating a voltage converter, wherein the converter comprises an inductor having a first end and a second end; a plurality of first switches, connected between the first end of the inductor and a plurality of first terminals; a plurality of second switches, connected between the second end of the inductor and a plurality of second terminals; a first ground switch, coupled between one of the ends of said inductor and a reference voltage; and a switch controller, coupled to drive on/off switching of said plurality of first switches; the method comprising:

closing a first one of the second switches, connected to a first one of the second terminals, and while the first one of the second switches is closed:

closing a first one of the first switches, connected to a first one of the first terminals, to store energy in the inductor;

opening the first one of the first switches and closing the first ground switch, to transfer energy from the inductor to the first one of the second terminals;

opening the first ground switch and closing a second one of the first switches, to store energy in the inductor; and opening the second one of the first switches and closing the first ground switch, to transfer energy from the inductor to the first one of the second terminals.

26. A voltage converter comprising:

an inductor having a first end and a second end;

a plurality of first switches, connected between the first end of the inductor and a plurality of first terminals;

a plurality of second switches, connected between the second end of the inductor and a plurality of second terminals;

a first ground switch for inductor discharge, coupled between one of the ends of said inductor and a reference voltage; and a switch controller, coupled to drive on/off switching of said plurality of first switches, said plurality of second switches and said first ground switch, wherein the switch controller is arranged to connect a first one of the first terminals to a different one or more of the second terminals, through the inductor, at different times, and to connect a second one of the first terminals to a different one or more of the second terminals, through the inductor, at different times.

27. The voltage converter of claim 26, wherein the switch controller is arranged to:

while a first one of the second switches, connected to a first one of the second terminals, is closed:

close a first one of the first switches, connected to a first one of the first terminals, to store energy in the inductor;

open the first one of the first switches and close the first ground switch, to transfer energy from the inductor to the first one of the second terminals;

open the first ground switch and close a second one of the first switches, to store energy in the inductor; and open the second one of the first switches and close the first ground switch, to transfer energy from the inductor to the first one of the second terminals.

* * * * *